(12) United States Patent
Brizard

(10) Patent No.: US 9,381,986 B2
(45) Date of Patent: Jul. 5, 2016

(54) JET-PUMP-BASED AUTONOMOUS UNDERWATER VEHICLE AND METHOD FOR COUPLING TO OCEAN BOTTOM DURING MARINE SEISMIC SURVEY

(71) Applicant: CGG SERVICES SA, Massy (FR)

(72) Inventor: Thierry Brizard, Massy (FR)

(73) Assignee: SEABED GEOSOLUTIONS B.V., Leidschendam (NL)

( * ) Notice: Subject to any disclaimer, the term of this patent is extended or adjusted under 35 U.S.C. 154(b) by 235 days.

(21) Appl. No.: 14/082,545

(22) Filed: Nov. 18, 2013

(65) Prior Publication Data

US 2014/0140170 A1 May 22, 2014

Related U.S. Application Data

(60) Provisional application No. 61/729,007, filed on Nov. 21, 2012, provisional application No. 61/761,430, filed on Feb. 6, 2013.

(51) Int. Cl.
*G01V 1/38* (2006.01)
*B63G 8/08* (2006.01)
(Continued)

(52) U.S. Cl.
CPC *B63G 8/08* (2013.01); *B63G 8/001* (2013.01); *G01V 1/3852* (2013.01); *B63B 2035/007* (2013.01); *B63G 8/16* (2013.01); *B63G 2008/004* (2013.01); *B63H 25/46* (2013.01)

(58) Field of Classification Search
CPC ..... G01V 1/3826; G01V 1/3852; B63G 8/08; B63G 8/001; B63G 8/16; B63G 2008/004; B63H 25/46; B63B 2035/007

USPC ................................. 367/15, 16; 114/337
See application file for complete search history.

(56) References Cited

U.S. PATENT DOCUMENTS 3,685,608 A 8/1972 Hamilton
4,095,550 A 6/1978 Kerr
(Continued)

FOREIGN PATENT DOCUMENTS

CN 102213594 10/2011
EP 1217390 6/2002
(Continued)

OTHER PUBLICATIONS

"Manned Maneuvering Unit Users' Guide," Martin Marietta, 1978, downloaded Oct. 15, 2015 from http://ntrs.nasa.gov/archive/nasa/casi.ntrs.nasa.gov/19790008382.pdf. 73 pp.*
(Continued)

*Primary Examiner* — Daniel L Murphy
(74) *Attorney, Agent, or Firm* — Park, Vaughan, Fleming & Dowler LLP; Shan A. Nelson

(57) ABSTRACT

An autonomous underwater vehicle (AUV) is configured to record seismic signals during a marine seismic survey. The AUV includes a body having a base (B) and first and second sides (A, C), the body having a head part and a tail part; a propulsion system for guiding the AUV to a final target on the ocean bottom; jet pumps connected to corresponding nozzles on the first and second sides (A, C); a control device connected to the jet pumps; and a seismic sensor configured to record seismic signals. The jet pumps are actuated by the control device in a given sequence so that the base (B) penetrates into the ocean bottom.

28 Claims, 15 Drawing Sheets

(51) Int. Cl.
*B63G 8/00* (2006.01)
*B63H 25/46* (2006.01)
*B63G 8/16* (2006.01)
*B63B 35/00* (2006.01)

(56) References Cited

U.S. PATENT DOCUMENTS

| | | | |
|---|---|---|---|
| 5,243,565 | A | 9/1993 | Yamamoto |
| 5,253,605 | A | 10/1993 | Collins |
| 5,758,592 | A | 6/1998 | Benson, Jr. |
| 5,894,450 | A | 4/1999 | Schmidt et al. |
| 6,044,745 | A | 4/2000 | Hickey |
| 6,390,012 | B1 | 5/2002 | Watt et al. |
| 6,474,254 | B1 | 11/2002 | Ambs et al. |
| 6,482,054 | B2 | 11/2002 | Treaster et al. |
| 6,625,083 | B2 * | 9/2003 | Vandenbroucke ... G01V 1/3852 181/112 |
| 6,779,475 | B1 | 8/2004 | Crane et al. |
| 6,932,185 | B2 | 8/2005 | Bary et al. |
| 6,951,138 | B1 | 10/2005 | Jones |
| 7,016,260 | B2 | 3/2006 | Bary |
| 7,037,150 | B2 * | 5/2006 | Morvillo ............. B63H 11/11 114/151 |
| 7,124,698 | B1 | 10/2006 | Shen et al. |
| 7,148,416 | B1 | 12/2006 | Rice |
| 7,724,641 | B2 | 5/2007 | Naes |
| 7,252,046 | B1 | 8/2007 | Ead et al. |
| 7,496,002 | B2 | 2/2009 | Vosburgh |
| 7,736,094 | B1 | 6/2010 | Bianchi et al. |
| 7,796,466 | B2 | 9/2010 | Combee et al. |
| 7,965,583 | B2 | 6/2011 | Thomas |
| 8,025,021 | B2 | 9/2011 | Gosling |
| 8,096,254 | B1 | 1/2012 | Bauer et al. |
| 8,109,223 | B2 | 2/2012 | Jamieson |
| 8,576,658 | B2 | 11/2013 | Thomas |
| 8,677,921 | B2 | 3/2014 | Gosling |
| 8,717,844 | B2 | 5/2014 | Welker et al. |
| 8,881,665 | B2 | 11/2014 | Brizard et al. |
| 8,982,662 | B2 | 3/2015 | Rouquette et al. |
| 9,090,319 | B2 | 7/2015 | Brizard et al. |
| 2001/0049239 | A1 | 12/2001 | Treaster et al. |
| 2006/0002230 | A1 | 1/2006 | Berg et al. |
| 2006/0140053 | A1 | 6/2006 | Naes |
| 2008/0144442 | A1 | 6/2008 | Combee |
| 2008/0225643 | A1 | 9/2008 | Vosburgh |
| 2010/0000459 | A1 | 1/2010 | Colangelo |
| 2010/0157727 | A1 | 6/2010 | Woodard, Jr. et al. |
| 2010/0182870 | A1 | 7/2010 | Norris et al. |
| 2010/0302901 | A1 | 12/2010 | Welker et al. |
| 2011/0297121 | A1 | 12/2011 | Kraus et al. |
| 2012/0057430 | A1 | 3/2012 | Rouquette et al. |
| 2012/0069702 | A1 | 3/2012 | Muyzert et al. |
| 2013/0083622 | A1 | 4/2013 | Herrmann et al. |
| 2013/0083623 | A1 | 4/2013 | Brizard et al. |
| 2013/0163374 | A1 | 6/2013 | Herrmann et al. |
| 2014/0053768 | A1 | 2/2014 | Brizard et al. |
| 2014/0078861 | A1 | 3/2014 | Tamanaja et al. |
| 2014/0140170 | A1 | 5/2014 | Brizard et al. |
| 2014/0177387 | A1 | 6/2014 | Brizard et al. |
| 2015/0276959 | A1 | 10/2015 | Grimsdale et al. |

FOREIGN PATENT DOCUMENTS

| | | |
|---|---|---|
| EP | 1319964 | 6/2003 |
| GB | 2041301 | 9/1980 |
| GB | 2163114 | 2/1986 |
| WO | 01/73477 | 10/2001 |
| WO | 0173477 | 10/2001 |
| WO | 03/005062 A1 | 1/2003 |
| WO | 2005/010316 | 2/2005 |
| WO | 2007/040411 A1 | 4/2007 |
| WO | 2011/106237 | 9/2011 |
| WO | 2012/013171 | 2/2012 |
| WO | 2012/013962 | 2/2012 |
| WO | 2012085590 | 6/2012 |
| WO | 2013041838 | 3/2013 |
| WO | 2013045669 | 4/2013 |
| WO | 2013076488 | 5/2013 |
| WO | 2013128187 | 9/2013 |
| WO | 2013128188 | 9/2013 |
| WO | 2014096265 | 6/2014 |

OTHER PUBLICATIONS

International Search Report mailed Feb. 20, 2014, in related International Application No. PCT/EP2013/074409.
Written Opinion of the International Searching Authority mailed Feb. 20, 2014, in related International Application No. PCT/EP2013/074409.
Tadahiro Hyakudome; "Design of Autonomous Underwater Vehicle"; Japan Agency for Marine-Earth Science and Technology (JAMSTEC), Japan; International Journal of Advanced Robotic Systems; vol. 8, No. 1 (2011) ISSN 1729-8806; pp. 122-130; [downloaded from http://www.intechopen.com/journals/international_journal_of_advanced_robotic_systems/design-of-autonomous-underwater-vehicle].
Hiroshi Yoshida, et al.; "New Attemps in the MR-X1 Sea-Trials: The Working AUV Tries to Survey of the Sea Floor and to Take Mud Samples"; Paper No. OMAE2010-20347; Proceedings of the ASME 2010 29th International Conference on Ocean, Offshore and Arctic Engineering; Jun. 6-11, 2010; Shanghai, China; [Downloaded From: http://proceedings.asmedigitalcollection.asme.org/ on Nov. 25, 2015].
International Search Report in corresponding International Application No. PCT/EP2012/069144 mailed Feb. 4, 2013.
Written Opinion in corresponding International Application No. PCT/EP2012/069144 mailed Feb. 4, 2013.
International Search Report in corresponding International Application No. PCT/EP2012/069145 mailed Feb. 6, 2013.
Written Opinion in corresponding International Application PCT/EP2012/069145 mailed Feb. 6, 2013.
D. R. Yoerger, et al.; "Fine-Scale Seafoor Survey in Rugged Deep-Ocean Terrain with Autonomous Robot"; Proceedings, ICRA, International Conference on Robotics and Automation, San Francisco, CA, Apr. 2000; ISBN 0-7803-5886-4 pp. 1787-1792.
Rhonda Duey; "Flying' Nodes Shift Marine Seismic Paradigm"; Dec. 1, 2011; pp. 1-2; [downloaded on Feb. 28, 2012 http://www.epmag.com/item/print/Flying-Nodes-Shift-Marine-Seismic-Paradigm-92689].

* cited by examiner

JET-PUMP-BASED AUTONOMOUS UNDERWATER VEHICLE AND METHOD FOR COUPLING TO OCEAN BOTTOM DURING MARINE SEISMIC SURVEY

CROSS REFERENCE TO RELATED APPLICATIONS

The present application claims the benefit of priority under 35 U.S.C. §119(e) to U.S. Provisional Application No. 61/729,007 filed on Nov. 21, 2012 and to U.S. Provisional Application No. 61/761,430 filed on Feb. 6, 2013. The entire contents of each of the above documents is hereby incorporated by reference into the present application.

BACKGROUND

1. Technical Field

Embodiments of the subject matter disclosed herein generally relate to methods and systems and, more particularly, to mechanisms and techniques for improving a coupling between the ocean bottom and an autonomous underwater vehicle (AUV) that carries seismic sensors for a marine seismic survey.

2. Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of geophysical structures under the seafloor is an ongoing process.

Reflection seismology is a method of geophysical exploration to determine the properties of earth's subsurface, which is especially helpful in determining the above-noted reservoirs. Marine reflection seismology is based on using a controlled source of energy that sends the energy into the earth. By measuring the time it takes for the reflections and/or refractions to come back to plural receivers, it is possible to evaluate the depth of features causing such reflections. These features may be associated with subterranean hydrocarbon deposits.

A traditional system for generating seismic waves and recording their reflections off geological structures present in the subsurface includes a vessel that tows an array of seismic receivers provided on streamers. The streamers may be disposed horizontally, i.e., lying at a constant depth relative to the ocean surface, or they may have other than horizontal spatial arrangements. The vessel also tows a seismic source array configured to generate a seismic wave. The seismic wave propagates downward and penetrates the seafloor until eventually a reflecting structure (reflector) reflects the seismic wave. The reflected seismic wave propagates upward until detected by the receiver(s) on the streamer(s). Based on the data collected by the receiver(s), an image of the subsurface is generated.

However, this traditional configuration is expensive because the cost of streamers is high. Further, this configuration is limited when various obstacles (e.g., a rig) are present in the surveying area. New technologies deploy plural seismic sensors on the bottom of the ocean (ocean bottom stations) to improve the coupling. Even so, positioning seismic sensors remains a challenge.

Other technologies use permanent receivers set on the ocean bottom, as disclosed in U.S. Pat. No. 6,932,185, the entire content of which is incorporated herein by reference. In this case, the seismic sensors are attached to a heavy pedestal. A station that includes the sensors is launched from a vessel and arrives, due to its gravity, at a desired position and remains on the bottom of the ocean permanently. Data recorded by sensors is transferred through a cable to a mobile station. When necessary, the mobile station may be brought to the surface to retrieve the data.

Although this method provides better coupling between the ocean bottom and the sensors, it is still expensive and not flexible because the sensors and corresponding pedestals are left on the seafloor. Further, positioning the sensors is not straightforward.

A different approach is the use of plural AUVs for carrying seismic sensors and collecting seismic data. The AUVs may be (1) launched from a deployment vessel, (2) guided to a final destination on the ocean bottom, (3) instructed to record seismic data, and then (4) instructed to surface or dock to a receiving vessel for transmitting the seismic data. However, deploying AUVs for collecting seismic data poses many challenges, such as the coupling between the ocean bottom and the seismic sensor. The seismic sensor is currently located on the AUV's outer skin or in a chamber inside the AUV, so it is possible for the seismic sensor to not come in direct contact with the ocean bottom. Further, if the ocean bottom is hard, the AUV itself may not have good contact with it. If marine currents are present, the AUV may drift from its intended target location, which degrades the recorded seismic data.

Accordingly, it would be desirable to provide systems and methods that provide an inexpensive and simple way to achieve good coupling between the AUV and the ocean bottom.

SUMMARY

According to one exemplary embodiment, there is an autonomous underwater vehicle (AUV) for recording seismic signals during a marine seismic survey. The AUV includes a body having a base (B) and first and second sides (A, C), the body having a head part and a tail part; a propulsion system for guiding the AUV to a final target on the ocean bottom; jet pumps connected to corresponding nozzles on the first and second sides (A, C); a control device connected to the jet pumps; and a seismic sensor configured to record seismic signals. The jet pumps are actuated by the control device in a given sequence so that the base (B) penetrates into the ocean bottom.

According to another embodiment, there is an AUV for recording seismic signals during a marine seismic survey. The AUV includes a propulsion system for guiding the AUV to a final target on the ocean bottom; jet pumps connected to corresponding nozzles located on a body of the AUV; and a control device connected to the jet pumps. The jet pumps are actuated by the control device in a given sequence so that a base (B) of the body is anchored into the ocean bottom.

According to still another embodiment, there is a marine seismic survey system for generating seismic waves and recording seismic signals. The system includes a source vessel towing a seismic source for generating the seismic waves; and plural AUVs for recording the seismic signals. An AUV includes a propulsion system for guiding the AUV to a final target on the ocean bottom; jet pumps connected to corresponding nozzles located on a body of the AUV; and a control device connected to the jet pumps. The jet pumps are actuated by the control device in a given sequence so that a base (B) of the body is anchored into the ocean bottom.

According to yet another embodiment, there is a method for anchoring to the ocean bottom an AUV for recording seismic signals during a marine seismic survey. The method includes a step of launching the AUV in water, the AUV having a body that includes a base (B) and first and second sides (A, C), the body having a head part and a tail part; a step of guiding the AUV with a propulsion system to a final target on the ocean bottom; a step of activating with a control device, in a given sequence, plural jet pumps connected to corresponding nozzles on the first and second sides (A, C), so that the base (B) penetrates into the ocean bottom; and a step of recording with a seismic sensor the seismic signals.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
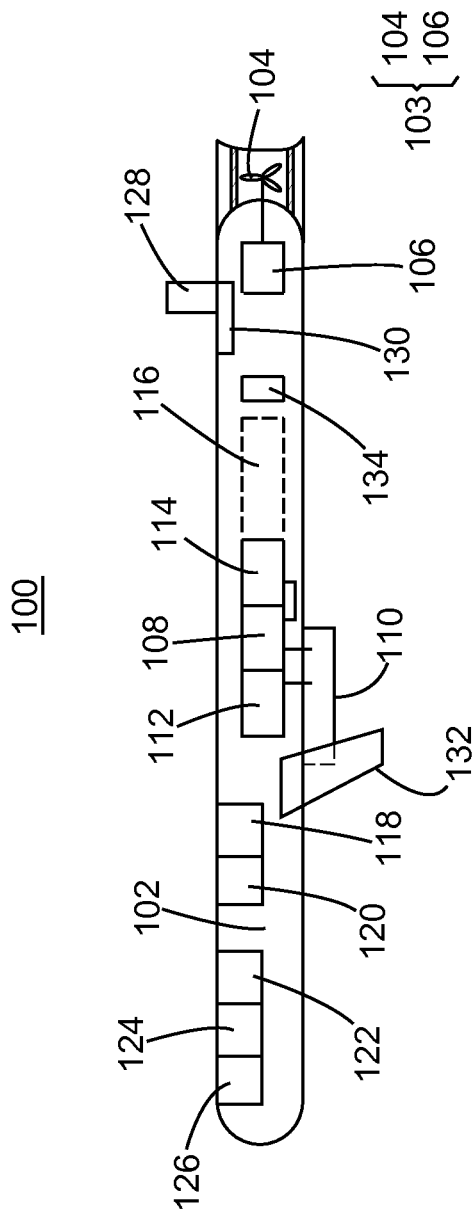
FIG. 1 is a schematic diagram of an AUV.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an AUV having one or more seismic sensors aboard and one or more vents for ejecting water. However, the embodiments to be discussed next are not limited to AUVs, but may be applied to other platforms (e.g., glider, buoy, etc.) that may carry seismic sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Emerging technologies in marine seismic surveys need an inexpensive system for deploying and recovering seismic receivers at the ocean bottom. According to an exemplary embodiment, such a seismic system includes plural AUVs, each having one or more seismic sensors. The seismic sensors may be one of a hydrophone, geophone, accelerometers, electromagnetic sensors, etc. If an electromagnetic sensor is used, then a source that emits electromagnetic waves may be used instead of or in addition to an acoustic source.

The AUV may be a specially designed device or an off-the-shelf device so that it is inexpensive. The off-the-shelf device may be quickly retrofitted or modified to include seismic sensors and necessary communications means to be discussed later. The AUV may include, besides or in addition to a propulsion system, a buoyancy system. The buoyancy system may be a multi-phase system. A deployment vessel may store and launch AUVs as necessary for the seismic survey. After leaving the deployment vessel, the AUVs find their target positions using, for example, an inertial navigation system, or another means. Thus, AUVs may be preprogrammed or partially programmed to find their target positions. If an AUV is partially programmed, the final detail for finding the target position may be received, e.g., acoustically, from the vessel when the AUV is launched from the vessel and/or while the AUV is navigating underwater. In the following, reference is made to a deployment vessel and/or a recovery vessel. Note that these vessels may be identical from an equipment standpoint. In one application, the deployment vessel is the same as the recovery vessel. Thus, when the document refers to a vessel, it might be the recovery vessel, the launching vessel or both of them. The deployment and/or recovery vessel may be a traditional vessel or an underwater platform, connected or not to a surface vessel, or it may be an unmanned vessel that floats at the water's surface or underwater, etc.

As the deployment vessel is launching AUVs, a shooting vessel may cross the survey area to generate seismic waves. In one application, the sources are provided on the deployment vessel or on other AUVs. The shooting vessel may tow one or more seismic source arrays. The seismic source array may include plural individual seismic sources arranged on a horizontal, slanted or curved line underwater. The individual seismic source may be an air gun, a vibrational source or other known seismic sources. The shooting vessel or another vessel, e.g., the recovery vessel, may then instruct selected AUVs to resurface or to move underwater to a given location so they can be collected or dock with the recovery vessel. In one embodiment, the deployment vessel, if a traditional vessel, can also tow source arrays and shoot them as it deploys AUVs. In still another exemplary embodiment, only the deployment vessel is configured to retrieve AUVs. However, it is possible that only the shooting vessel is configured to retrieve AUVs. Alternatively, a dedicated recovery vessel may wake up the AUVs and instruct them to return to the surface for recovery. In another application, AUVs are not launched from a vessel, but may be stored on a docking station, e.g., floating underwater, or attached to a vessel or unmanned surface vessel, or other platform that is not a vessel.

In one exemplary embodiment, AUVs number in the thousands. Thus, the deployment vessel is configured to hold some or all of them at the beginning of the survey and then to launch them as the survey advances. If the deployment vessel is configured to hold only some of the AUVs, then more deployment vessels may be used to accommodate all the AUVs. If the shooting vessel is configured to retrieve AUVs, when the number of available AUVs at the deployment vessel falls below a predetermined threshold, the shooting vessel and the deployment vessel are instructed to switch positions in mid-survey. If a dedicated recovery vessel is used to recover AUVs, then the deployment vessel is configured to switch positions with the recovery vessel when the deployment vessel becomes empty. In another exemplary embodiment, both vessels are full of AUVs. The first one starts deploying AUVs, and the second one just follows the first one. Once the first one has deployed most or all of the AUVs, this vessel becomes the recovery vessel and the second one starts deploying AUVs, thus becoming the deployment vessel. Later, the two vessels may switch functions as necessary.

In an exemplary embodiment, the seismic survey is performed as a combination of AUV seismic sensors and streamer seismic sensors towed by the deployment vessel, the shooting vessel or both of them.

In still another exemplary embodiment, when selected AUVs are instructed to surface, they may be programmed to go to a desired rendezvous point where they will be collected by the shooting vessel, the deployment vessel or the recovery vessel. Alternatively, AUVs may be instructed to dock with a corresponding vessel as will be described later. Selected AUVs may belong to a given row or column if a row and column arrangement is used. The shooting and/or deployment or recovery vessel may be configured to send acoustic signals to the returning AUVs to guide them to the desired position. AUVs may be configured to rise to a given altitude, execute the return path at that altitude, and then surface for recovery or dock underwater near the corresponding vessel. In one exemplary embodiment, AUVs are configured to communicate among themselves so they follow each other back to the recovery vessel, or they communicate among themselves to establish a queue in which to be retrieved by the shooting, recovery or deployment vessel.

Once on the vessel, AUVs may be checked for problems, their batteries may be recharged or replaced, and stored seismic data may be transferred to the vessel for processing. Alternatively or in addition, a compressed gas tank may be replaced or recharged for powering the AUV buoyancy system. The recovery vessel may store AUVs on deck during maintenance or somewhere inside the vessel, e.g., inside a module, closed or open, that is fixed on the vessel or the vessel's deck. A conveyor-type mechanism may be designed to recover AUVs on one side of the vessel when the vessel is used as a recovery vessel, and to launch AUVs from the other side of the vessel when the vessel is used for deployment. After maintenance, AUVs are redeployed as the seismic survey continues. Thus, in one exemplary embodiment AUVs are continuously deployed and retrieved. In still another exemplary embodiment, AUVs are configured to not transmit seismic data to the deployment, recovery or shooting vessel while performing the seismic survey. This may be advantageous when the AUV's available electrical power is limited. In another exemplary embodiment, each AUV has enough electrical power (stored in the battery) to be deployed only once, record seismic data and resurface for retrieval. Thus, reducing data transmission volume between the AUV and the vessel while the AUV is underwater conserves power and allows the AUV to be retrieved on the vessel before running out of power. All the above embodiments may be adapted to not use traditional recovery and launching vessels, but rather other platforms, e.g., underwater platforms, unmanned vehicles, etc.

The above-noted embodiments are now discussed in more detail with regard to the figures. FIG. 1 illustrates an AUV 100 having a body 102 in which a propulsion system 103 may be located. Note that in one embodiment, there is no propulsion system. If the propulsion system 103 is available, it may include one or more propellers 104 and a motor 106 for activating the propeller 104. Alternatively, the propulsion system may include adjustable wings for controlling the AUV's trajectory. The motor 106 may be controlled by a processor 108. The processor 108 may also be connected to a seismic sensor 110, which may have a shape such that when the AUV lands on the seabed, the seismic sensor achieves a good coupling with seabed sediment. The seismic sensor may include one or more of a hydrophone, geophone, accelerometer, etc. For example, if a 4C (four component) survey is desired, the seismic sensor 110 includes three accelerometers and a hydrophone, i.e., a total of four sensors. Alternatively, the seismic sensor may include three geophones and a hydrophone. Of course, other sensor combinations are possible.

A memory unit 112 may be connected to the processor 108 and/or seismic sensor 110 for storing seismic data the sensor records. A battery 114 may be used to power all these components. The battery 114 may be allowed to move along a track 116 to change the AUV's center of gravity.

The AUV may also include an inertial navigation system (INS) 118 configured to guide the AUV to a desired location. An inertial navigation system includes at least a module containing accelerometers, gyroscopes or other motion-sensing devices. The INS is initially provided with the current position and velocity of the AUV from another source, for example, a human operator, a GPS satellite receiver, another INS from the vessel, etc., and thereafter, the INS computes its own updated position and velocity by integrating (and optionally filtrating) information received from its motion sensors. The advantage of an INS is that it requires no external references in order to determine its position, orientation or velocity once it has been initialized. Further, using an INS is inexpensive.

Besides or instead of the INS 118, the AUV may include a compass 120 and other sensors 122 as, for example, an altimeter for measuring its altitude, a pressure gauge, an interrogator module, etc. AUV 100 may optionally include an obstacle avoidance system 124 and a communication device 126 (e.g., Wi-Fi or other wireless communication) or other data transfer device capable of wirelessly transferring seismic data. In one embodiment, the transfer of seismic data takes place while the AUV is on the vessel. Also, the communication device 126 may be a port wire-connected to the vessel to transfer the seismic data. One or more of these elements may be linked to the processor 108. The AUV further includes an antenna 128 (which may be flush with the AUV's body) and a corresponding acoustic system 130 for communicating with the deploying, recovery or shooting vessel. Stabilizing fins and/or wings 132 for guiding the AUV to the desired position may be used with the propulsion system 103 for steering the AUV. However, in one embodiment, the AUV has no fins or wings. The AUV may include a buoyancy system 134 for controlling the AUV's depth as will be discussed later.

The acoustic system 130 may be an Ultra-Short Baseline (USBL) system, also sometimes known as Super Short Base Line (SSBL), which uses a method of underwater acoustic positioning. A complete USBL system includes a transceiver mounted on a pole under a vessel, and a transponder/responder on the AUV. A processor is used to calculate a position from the ranges and bearings the transceiver measures. For example, an acoustic pulse is transmitted by the transceiver and detected by the subsea transponder, which replies with its own acoustic pulse. This return pulse is detected by the transceiver on the vessel. The time from transmission of the initial acoustic pulse until the reply is detected is measured by the USBL system and converted into a range. To calculate a subsea position, the USBL calculates both a range and an angle from the transceiver to the subsea AUV. Angles are measured by the transceiver, which contains an array of transducers. The transceiver head normally contains three or more transducers separated by a baseline of, e.g., 10 cm or less.

Figure 2:
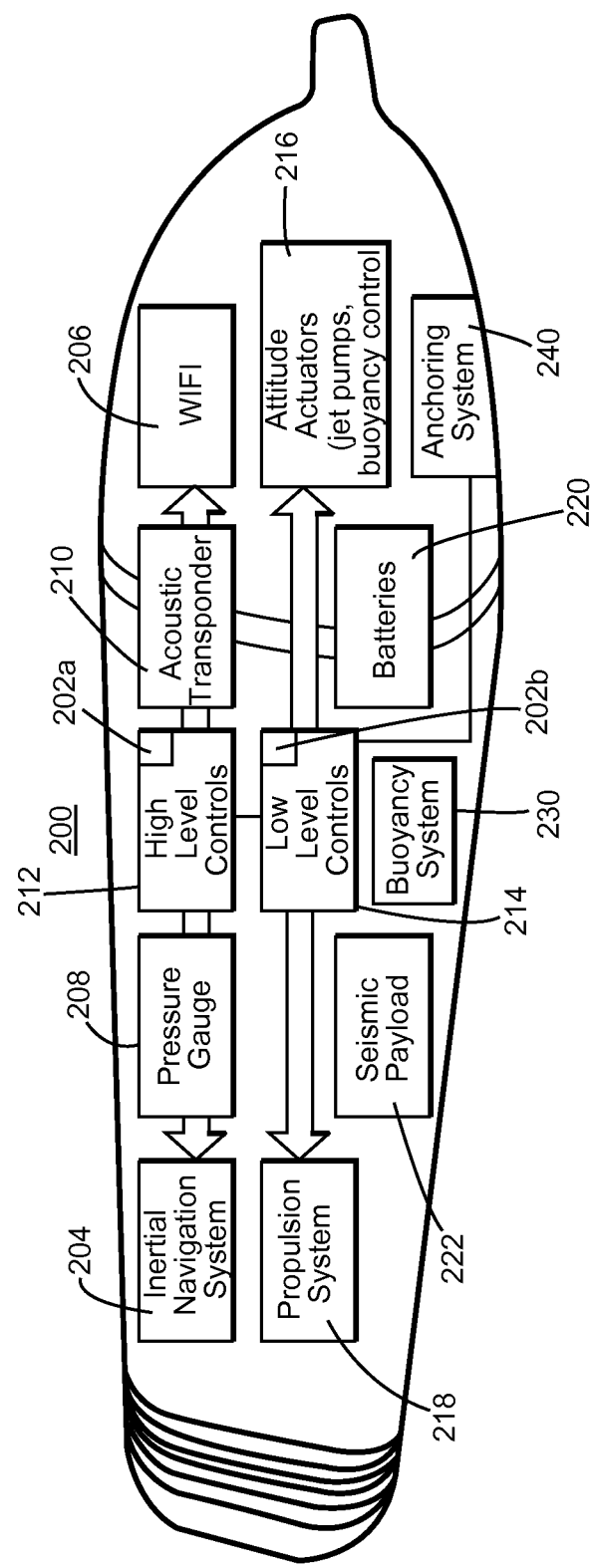
FIG. 2 is a high-level view of the internal configuration of an AUV.

FIG. 2 is a high-level view of AUV 200 that includes an anchoring system 240 for improving a coupling with the ocean bottom. Besides the anchoring system 240, AUV 200 may include a CPU 202a connected to INS 204 (or compass or altitude sensor and acoustic transmitter for receiving acoustic guidance from the deployment vessel), wireless interface 206, pressure gauge 208, and transponder 210. CPU 202a may be located in a high-level control block 212. The INS is advantageous when the AUV's trajectory has been changed, for example, because of an encounter with an unexpected object, e.g., fish, debris, etc., because the INS is capable of taking the AUV to the desired final position as it does for currents, wave motion, etc. Also, the INS may have high precision. For example, it is expected that for a target having a depth of 300 m, the INS and/or the acoustic guidance is capable of steering the AUV within +/−5 m of the desired target location. The INS may be configured to receive data from the vessel to increase its accuracy. In one application, the INS is replaced with another steering system. An optional CPU 202b, in addition to CPU 202a, is part of a low-level control module 214 configured to control attitude actuators 216 and propulsion system 218. The high-level control block 212 may communicate via a link with low-level control module 214 as shown in the figure. One or more batteries 220 may be located in AUV 200. A seismic payload 222 is located inside the AUV for recording seismic signals. A buoyancy system 230 that controls the AUV's buoyancy may also be located in AUV 200. Those skilled in the art would appreciate that more modules may be added to the AUV. For example, if a seismic sensor is outside the AUV's body, a skirt may be provided around or next to the sensor. A water pump may pump water from the skirt to create suction so that a good coupling between the sensor and the seabed is achieved. However, there are embodiments where no coupling with the seabed is desired. For those embodiments, no skirt is used.

A more detailed structure of an AUV 300 having an anchoring system is now discussed with reference to FIG. 3. AUV 300 has a body 302 that includes a payload 304 (e.g., seismic sensors) and acoustic transceiver 306. In one embodiment, the acoustic transceiver may partially extend outside body 302. Acoustic transceiver 306 is configured to communicate with the vessel and receive acoustic guidance while traveling toward a desired target point. Alternatively or additionally, an INS may be used for guidance. Many of the features discussed with regard to FIGS. 1 and 2 may be present in the body but, for simplicity, are neither shown nor discussed with regard to this figure.

Figure 3:
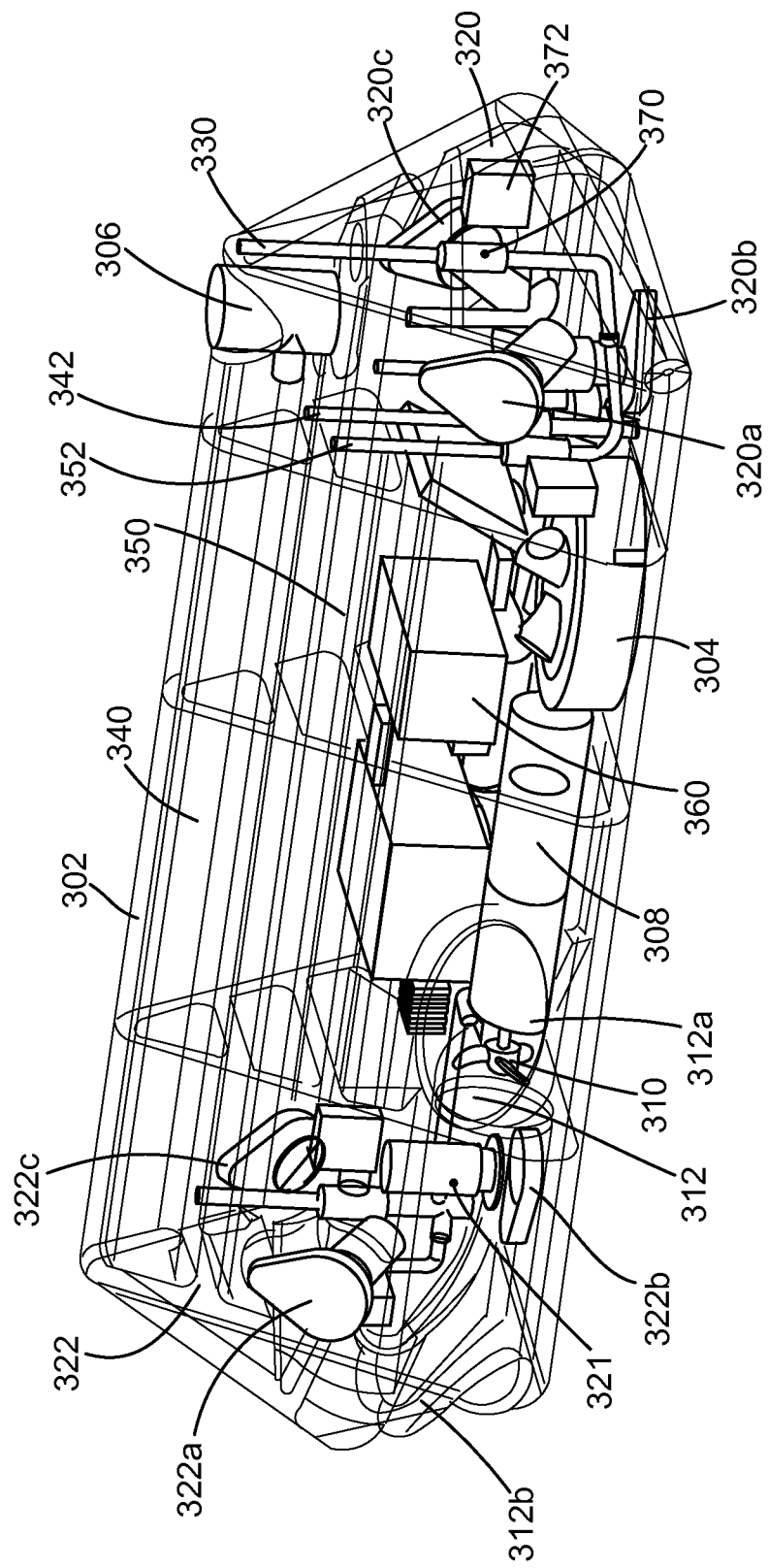
FIG. 3 is a detailed view of the internal configuration of an AUV.

FIG. 3 also shows a motor 308 configured to rotate a propeller 310 for providing thrust to AUV 300. One or more motors and corresponding propellers may be used. Alternatively, jet pumps may be used instead of motors. The entire motor 308 and propeller 310 may be within body 302. Propeller 310 may receive water through a channel 312 in body 302. Channel 312 has two openings, an intake water element 312a and propulsion nozzle 312b that communicate with the ambient water. The two openings may be located on the head, tail or middle portions of body 302.

Guidance nozzles may be provided at the head portion 320 and/or at the tail portion 322 of body 302. Three guidance nozzles 320a-c may be located at the head portion 320 and three guidance nozzles 322a-c may be located at the tail portion 322 of body 302. In one application, only the head nozzles are present. In still another application, only the tail nozzles are present. The nozzles are connected through piping to corresponding jet pumps 321. One or more jet pumps may be used to pump water through the nozzles. In one application, each nozzle is connected to a corresponding jet pump. Thus, each individual nozzle may be actuated independently. These jet pumps may take in water through various vents (e.g., 342, 352) and force the water through one or more of the guidance nozzles at desired speeds. Alternatively, the jet pumps may take in the water at one guidance nozzle and expel the water at the other nozzle or nozzles. Thus, according to this exemplary embodiment, the AUV has the capability of adjusting the position of its head with guidance nozzles 320a-c and the position of its tail with guidance nozzles. However, in another embodiment, only the tail nozzles or only the head nozzles are implemented.

By driving water out of the nozzles, according to this exemplary embodiment, the AUV has the ability to adjust its head's position (with guidance nozzles 320a-c) and its tail's position (with guidance nozzles 322a-c). However, in other embodiments, only the tail nozzles or only the head nozzles may be implemented and/or controlled. In still another exemplary embodiment, a translation of the AUV may be controlled with guidance nozzles as will be discussed later. In yet another exemplary embodiment, rotation of the AUV (yaw and pitch) may be controlled with guidance nozzles.

FIG. 3 also shows one or more chambers 340 and 350 that communicate through vents 330 with the ambient water so the chambers may be flooded when desired. A control unit 360 may instruct a water pump to provide water into one or more of chambers 340 and 350 (to partially or fully flood them) so that the AUV's buoyancy becomes neutral or negative. The same control unit 360 can instruct the water pump (or use another mechanism) to remove the water from the one or more chambers so the AUV's buoyancy becomes positive. Alternatively, control unit 360 instructs one or more valves 370 to fluidly connect vent 330 to the flooding chamber for making the AUV's buoyancy negative. For making the buoyancy positive, control unit 360 may instruct an accumulator 372 to provide compressed gas (e.g., air, $CO_2$, etc.) to the flooding chambers to expel water, and then valves 370 seal closed the emptied flooding chambers.

Figures 4, 4A:
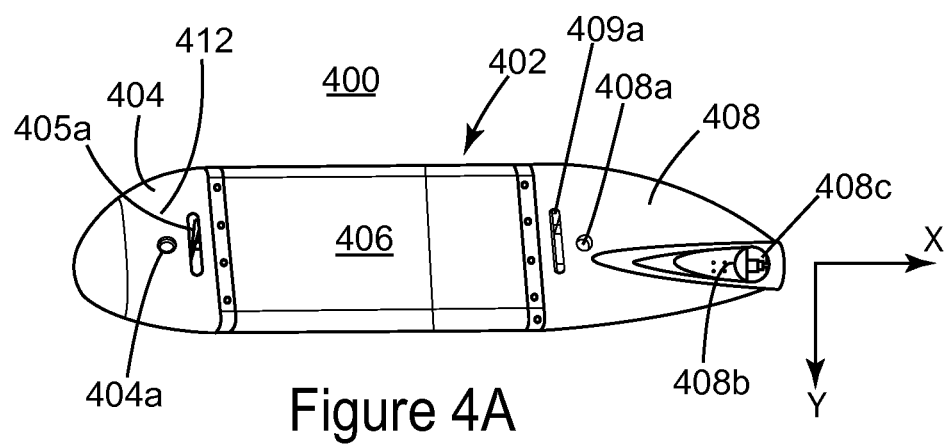
FIG. 4 is an external view of an AUV.

The nozzles and vents discussed above are illustrated in FIG. 4 for a given AUV 400. AUV 400 has a body 402 that extends along a longitudinal axis X. Body 402 may include three parts, a head part 404, a middle part 406 and a tail part 408. These parts may be actual parts manufactured separately and then connected to each other or to a skeleton (not shown) of the AUV. However, in one application, these parts are not physically distinct, but are used to more easily describe the AUV's shape. Various nozzles 404a and 408a and slots 405a and 409a are shown on body 402. The slots may be used as water intakes for one or more jet pumps, while the nozzles may be used as water outputs (guidance nozzles) for the same jet pumps. Each face of the head and tail parts (in this embodiment, each portion has three faces) may have corresponding nozzles. In another application, each face of the head and tail parts may have corresponding slots. One or more engines 408b and associated propellers 408c may be provided on the tail part 408 to constitute the propulsion system. In one embodiment, two engines and two propellers are located on body 402, and each engine may be controlled independently. However, in another embodiment, the engines and propellers are inside the body. Thus, in one exemplary embodiment, no component extends outside the body.

Figure 5:
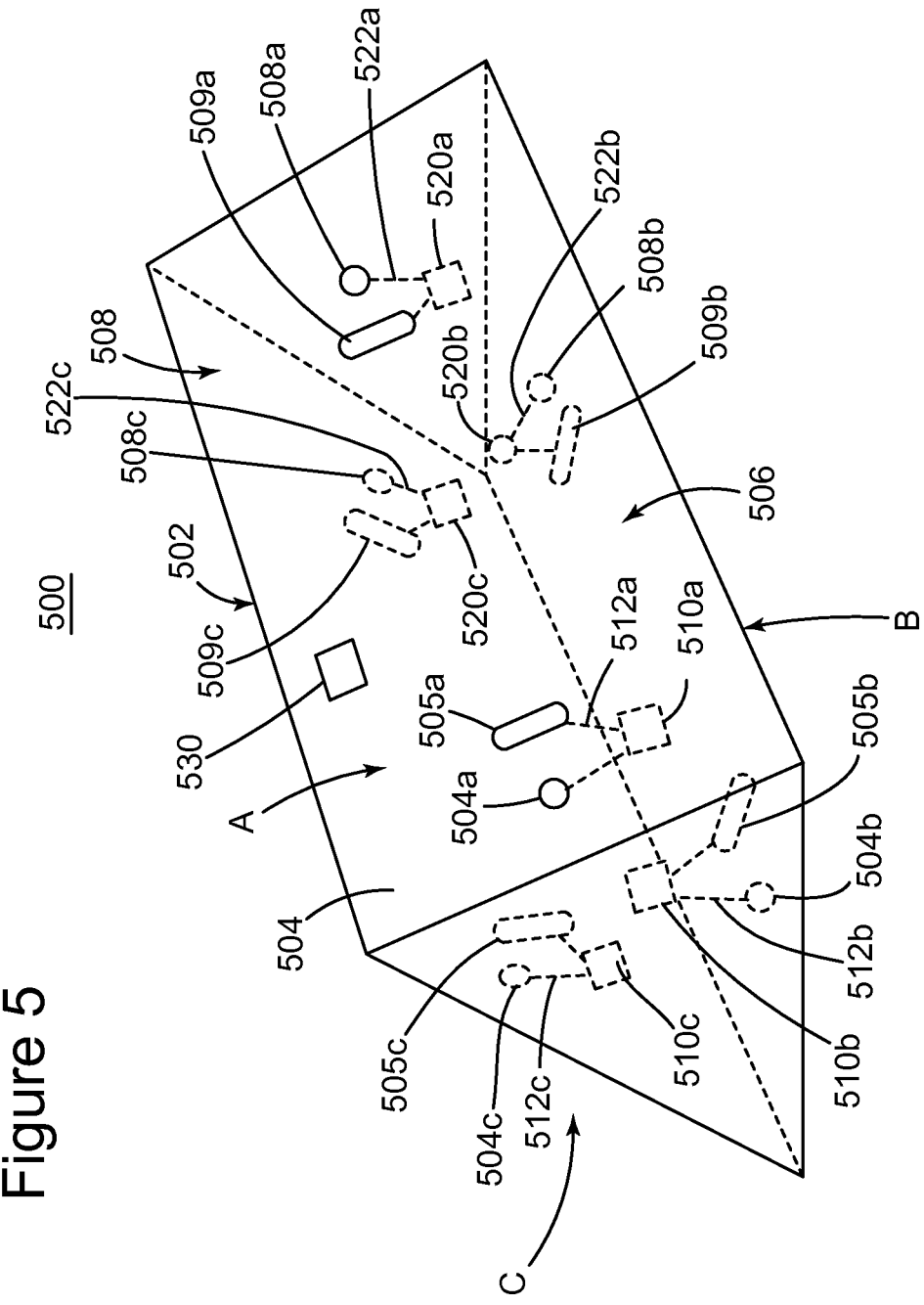
FIG. 5 is a schematic diagram illustrating jet pumps and associated vents of an AUV according to an exemplary embodiment.

According to an exemplary embodiment illustrated in FIG. 5, an AUV 500 has nozzles and slots on each face as now described. AUV 500 has a body 502 divided into a head part 504, a middle part 506 and a tail part 508. Each part has three faces, A, B and C. In another application, each portion may have a different number of faces. For simplicity, each element associated with a face has a subindex corresponding to that face. For example, nozzle 504a is located on face A, nozzle 504b is located on face B and nozzle 504c is located on face C. Vent 505a is located on face A, vent 505b is located on face B and vent 505c is located on face C. All these nozzles and vents are located on the head portion 504. Similar nozzles 508a-c and vents 509a-c are located on the three faces A-C on the tail part 508. Each nozzle is connected to a vent trough a jet pump. For example, nozzle 504a is fluidly connected to jet pump 510a through piping 512a, and jet pump 510a is also fluidly connected to vent 505a. The same is true for all the nozzles and vents illustrated in the figure. Thus, this embodiment includes three jet pumps 510a-c in head part 504 and three jet pumps 520a-c in tail part 508. However, in another application, the system may have four jet pumps in each portion (and associated vents and slots), one pushing up, one pushing down, one pushing right and one pushing left. Those skilled in the art would recognize that the number of pumps, slots and vents can vary. Appropriate piping 522a-c connects nozzles 508a-c and vents 509a-c to corresponding jet pumps 520a-c. A control device 530 may be connected to each jet pump and configured to individually control each of them.

With this configuration, AUV 500 may be programmed to anchor (couple) itself to the ocean bottom as now discussed. In this regard, anchoring system 240 discussed in FIG. 2 may include nozzles, vents, piping and jet pumps illustrated in FIG. 5. Note that the illustrated AUV 500 is very schematic and many of its details are omitted for simplicity.

Figure 6A:
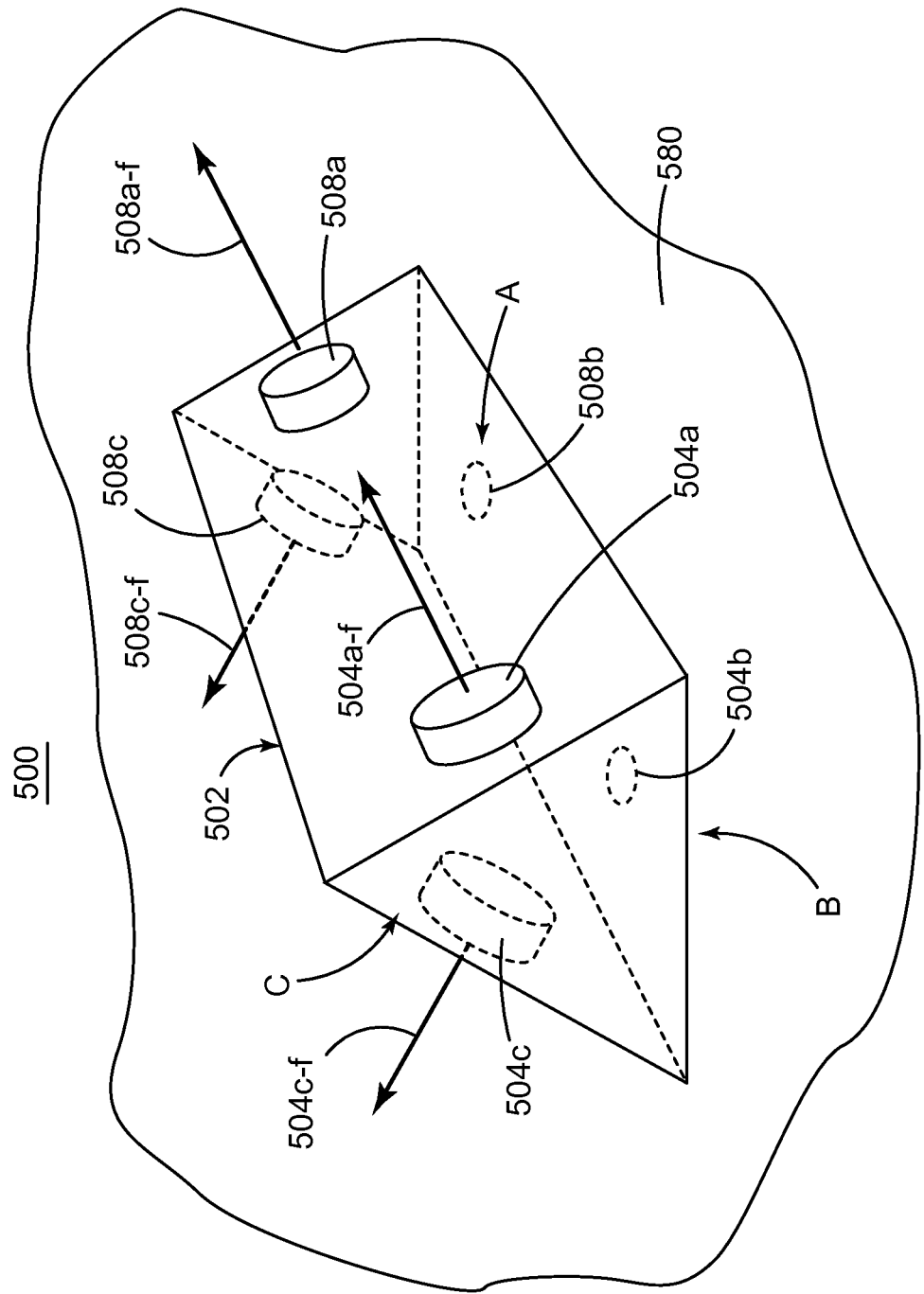
FIGS. 6A-E illustrate a jet pump activation sequence for anchoring an AUV according to exemplary embodiments.

An anchoring method is now discussed with regard to FIGS. 6A-E. FIG. 6A shows AUV 500 and front nozzles 504a and 504c and tail nozzles 508a and 508c. These nozzles are located on faces A and C of AUV 500. Face B is considered to be the bottom face and in contact with the ocean bottom 580. FIG. 6A also shows directions 504a-F, 504c-F, 508a-F and 508c-F in which the water is expelled from corresponding nozzles 504a, 504c, 508a and 508c, respectively. For this specific embodiment, head nozzle 504b and tail nozzle 508b are not used. After AUV 500 has landed on the ocean bottom 580, head nozzle 504a and tail nozzle 508c are activated, i.e., corresponding jet pumps 510a and 520c are activated by control device 530 for creating a torque that results in a rotational motion of the AUV along a first rotation direction 600 (see FIG. 6B, rotation of base face B relative to a vertical axis Z). The speed of the water jets and their time duration may vary from survey to survey. For example, a table may be stored in a storage memory of AUV 500 that takes into consideration the depth of the ocean bottom, and its consistency, i.e., stone, sand, mud, etc. At the beginning of the seismic survey, control device 530 may be programmed to select a speed and time duration for the jet pumps from the table.

Figure 6B:
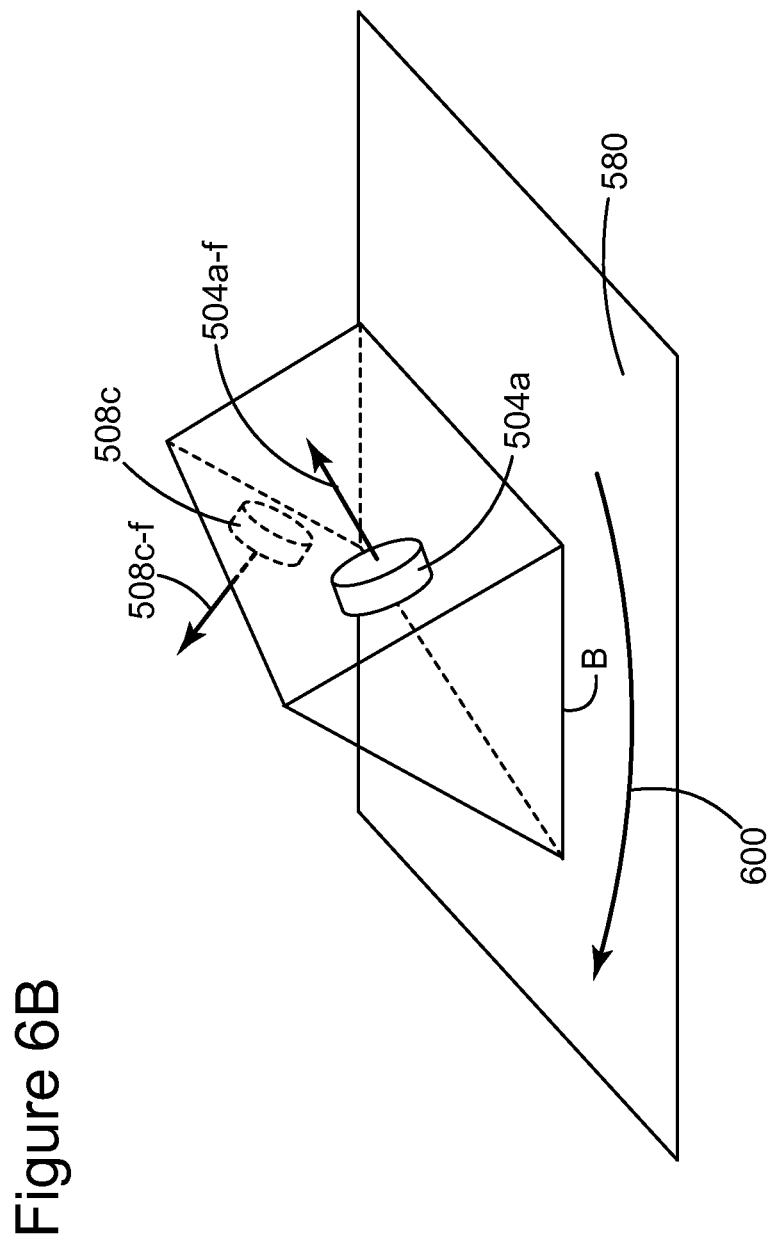
Figure 6C:
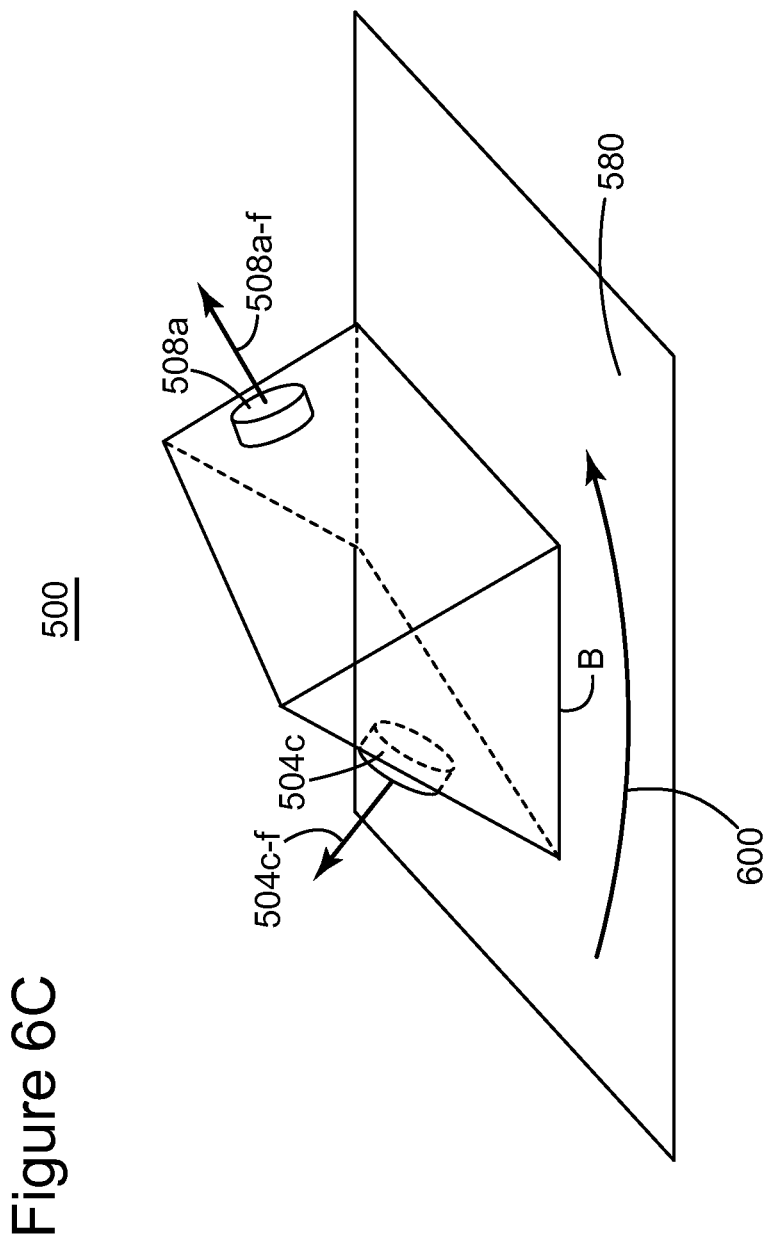
Figure 6D:
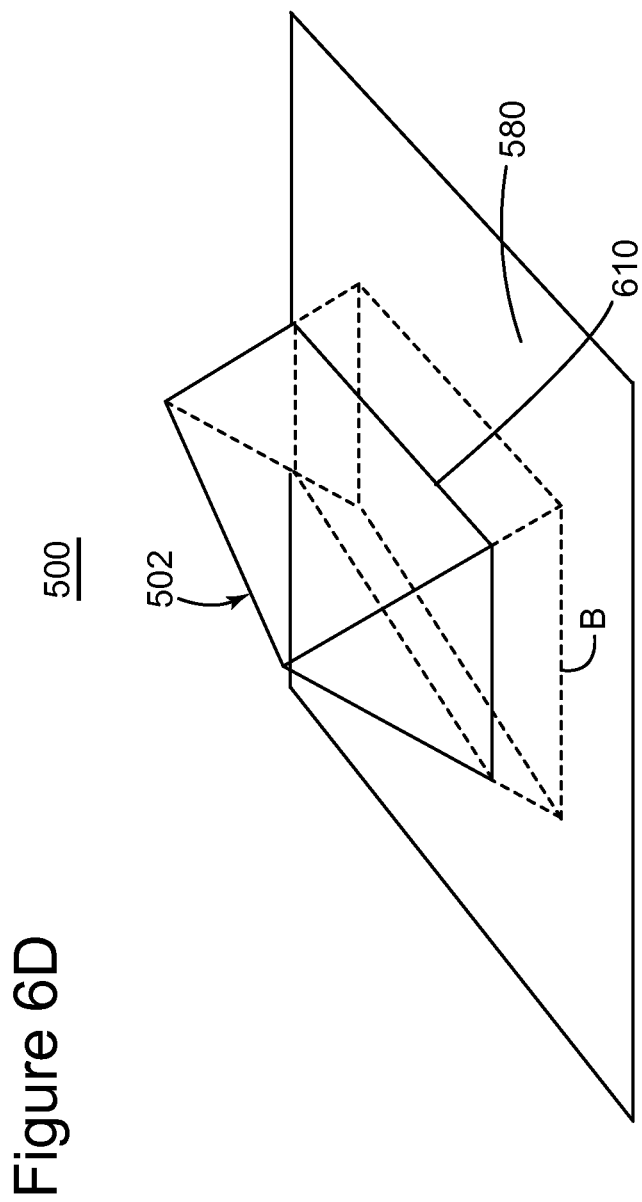

Next, as illustrated in FIG. 6C, front nozzle 504c and tail nozzle 508a are activated to produce opposite water jets 504c-F and 508a-F. These opposite water jets create a torque that makes AUV 500 rotate along a second rotation direction 602. Note that during each step, a head nozzle and a tail nozzle, on opposite sides of the AUV are activated to create the torque that partially rotates the AUV, thus, contributing to anchoring the AUV to the ocean floor. The result of these alternate steps of partially and alternately rotating the AUV are shown in FIG. 6D, i.e., note that AUV 500 has partially buried itself into ocean floor 580 (face B is shown buried and lateral faces A and C are partially buried up to a level 610. This burying or anchoring action of the AUV improves the coupling of the AUV and/or sensor with the ocean bottom and also stabilizes the AUV when there are strong currents on the ocean bottom which, under normal circumstances, will make the AUV drift.

Figure 6E:
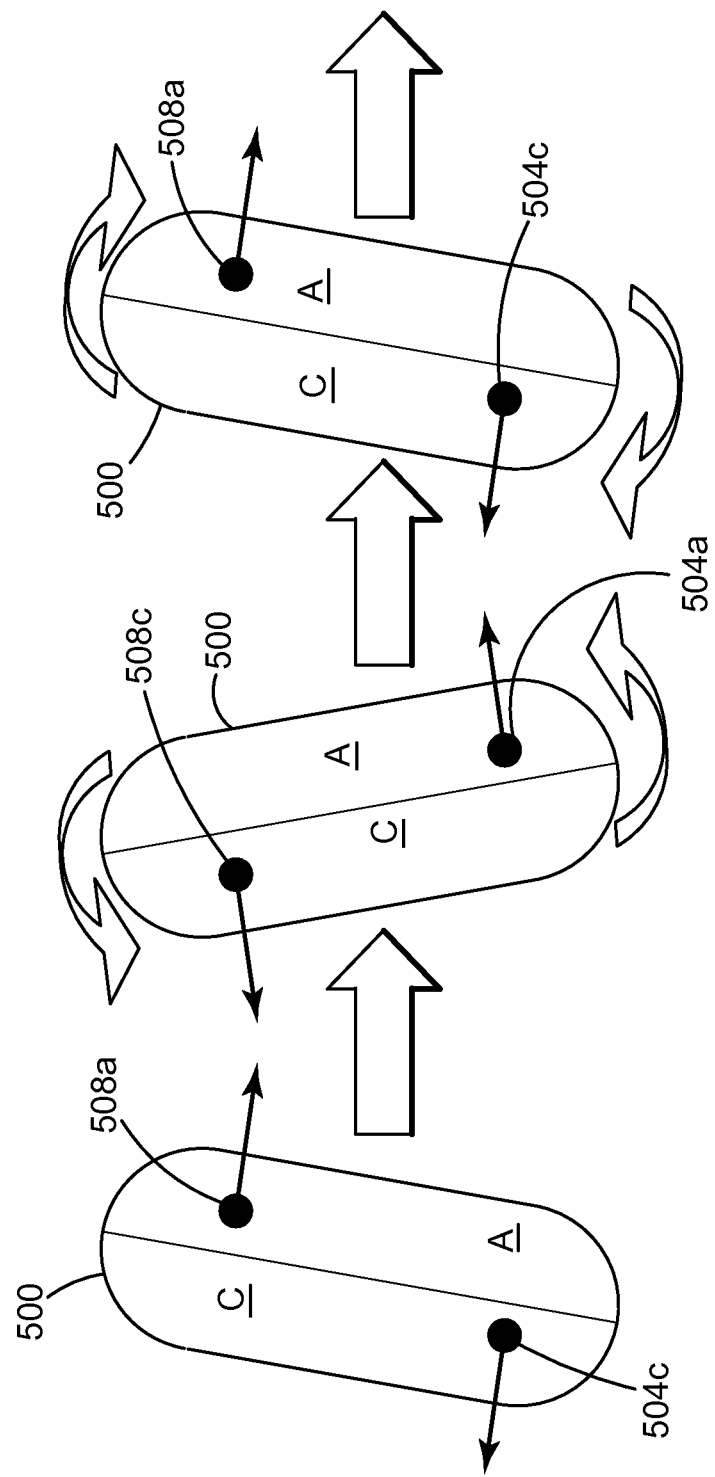

The above-described partial rotational motion is schematically shown in FIG. 6E, which is a top view of AUV 500, and shows it alternatively performing a twisting motion (partial rotation) for anchoring the AUV to the ocean floor. In other words, the head and tail nozzles are activated according to a given sequence (as illustrated in FIGS. 6B-D) for achieving the twisting motion. The given sequence may be repeated a predetermined number of times or for a set time.

In one application, the head and tail nozzles of the bottom face B may be used simultaneously with nozzles 504a, 504c, 508a and 508c for different reasons. For example, if the ocean bottom is known to be muddy or sandy, water jets may be pumped at slow speeds through bottom nozzles 504b and 508b to fluidize the floor, while the side nozzles are used as described above to impart the twisting motion. For that purpose, the jet pumps may be run at different speeds, for example, a first low speed to fluidize the ocean bottom and a second high speed for the twisting motion. In still another application, when it is time to detach the AUV from the ocean bottom, bottom nozzles 504b and 508b may be used at the second high speed to move the AUV away from the ocean bottom.

Figure 7A:
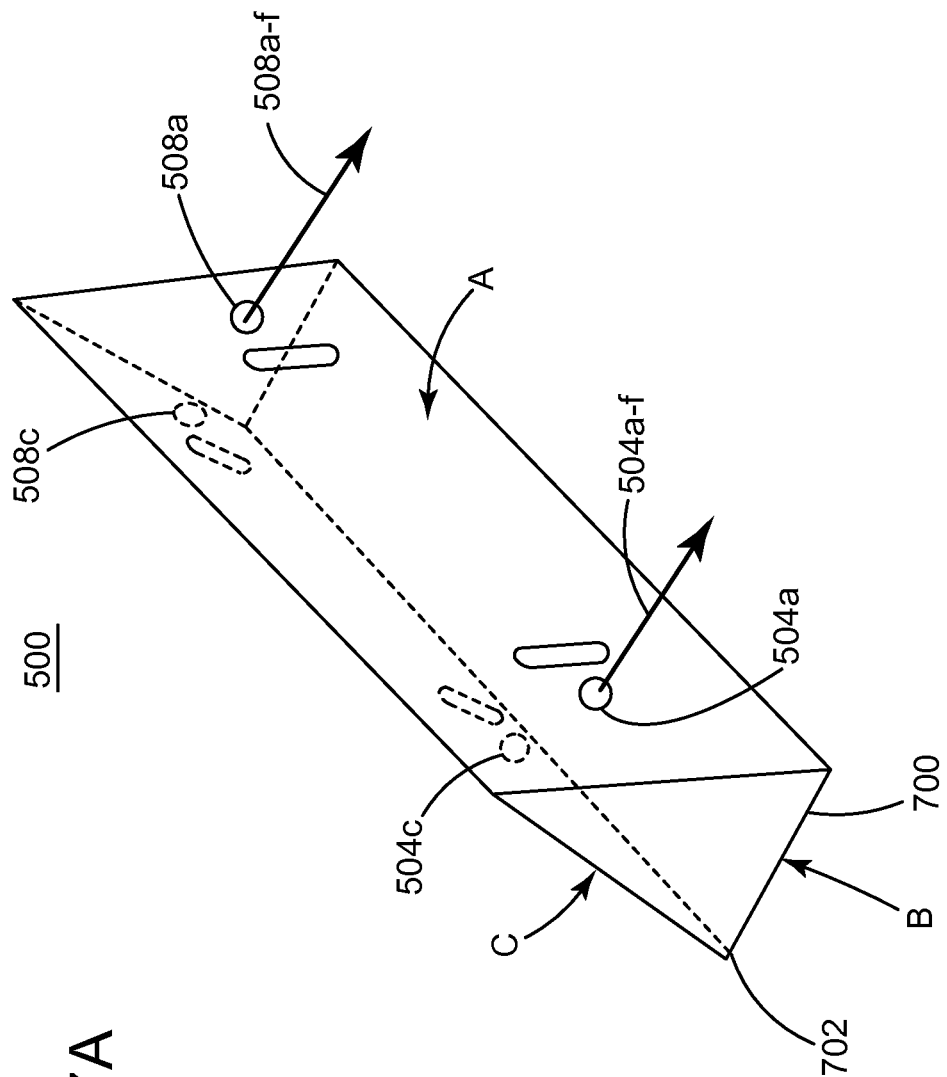
FIGS. 7A-B illustrate another jet pump activation sequence for anchoring an AUV according to an exemplary embodiment.
Figure 7B:
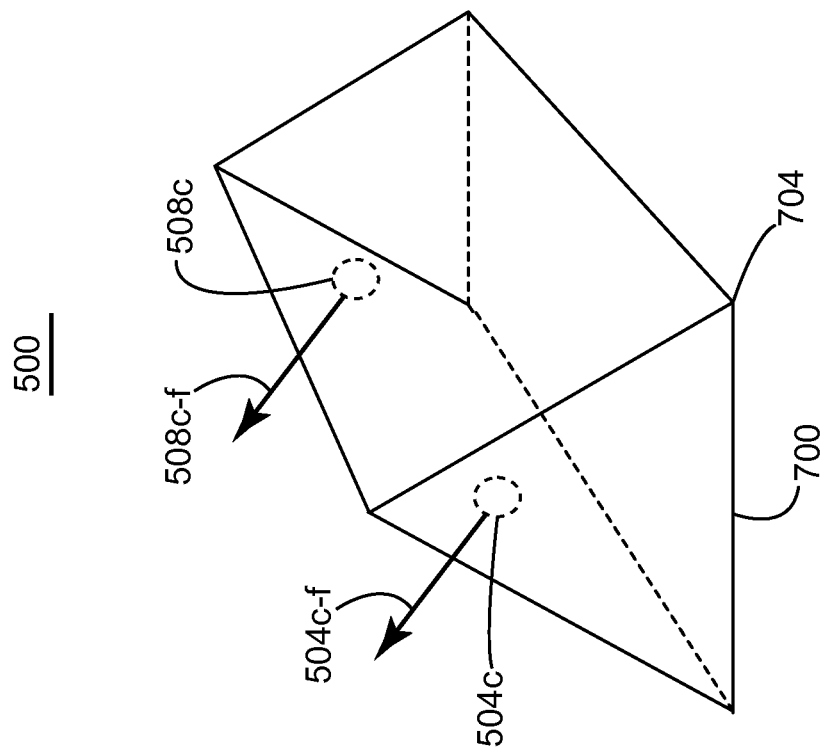

According to another embodiment illustrated in FIGS. 7A-B, control device 530 (illustrated in FIG. 5) may be configured to actuate the jet pumps in a different way to achieve anchoring. As shown in FIG. 7A, the control device actuates jet pumps 510a and 520a (shown in FIG. 5) simultaneously so that water jets 504a-F and 508a-F generated by nozzles 504a and 508a are produced on a same side A of AUV 500. These simultaneous forces applied on the same face of the AUV determine a side 700 of the AUV to pivot around a point 702. Then, the opposite nozzles 504c and 508c are activated to produce water jets 504c-F and 508c-F as shown in FIG. 7B. This activation sequence determines the side 700 of the AUV to pivot around a point 704. Repeating this different activation sequence allows the AUV to anchor itself to the ocean bottom by achieving this rocking motion.

According to another exemplary embodiment, the twisting motion illustrated in FIGS. 6A-E may be combined with the rocking motion illustrated in FIGS. 7A-B as discussed next. In one application, after each twisting motion, a rocking motion is applied. In another application, a number "n" of twisting motions are performed before applying a number "m" of rocking motions. The numbers n and m may be one or larger.

Figure 8:
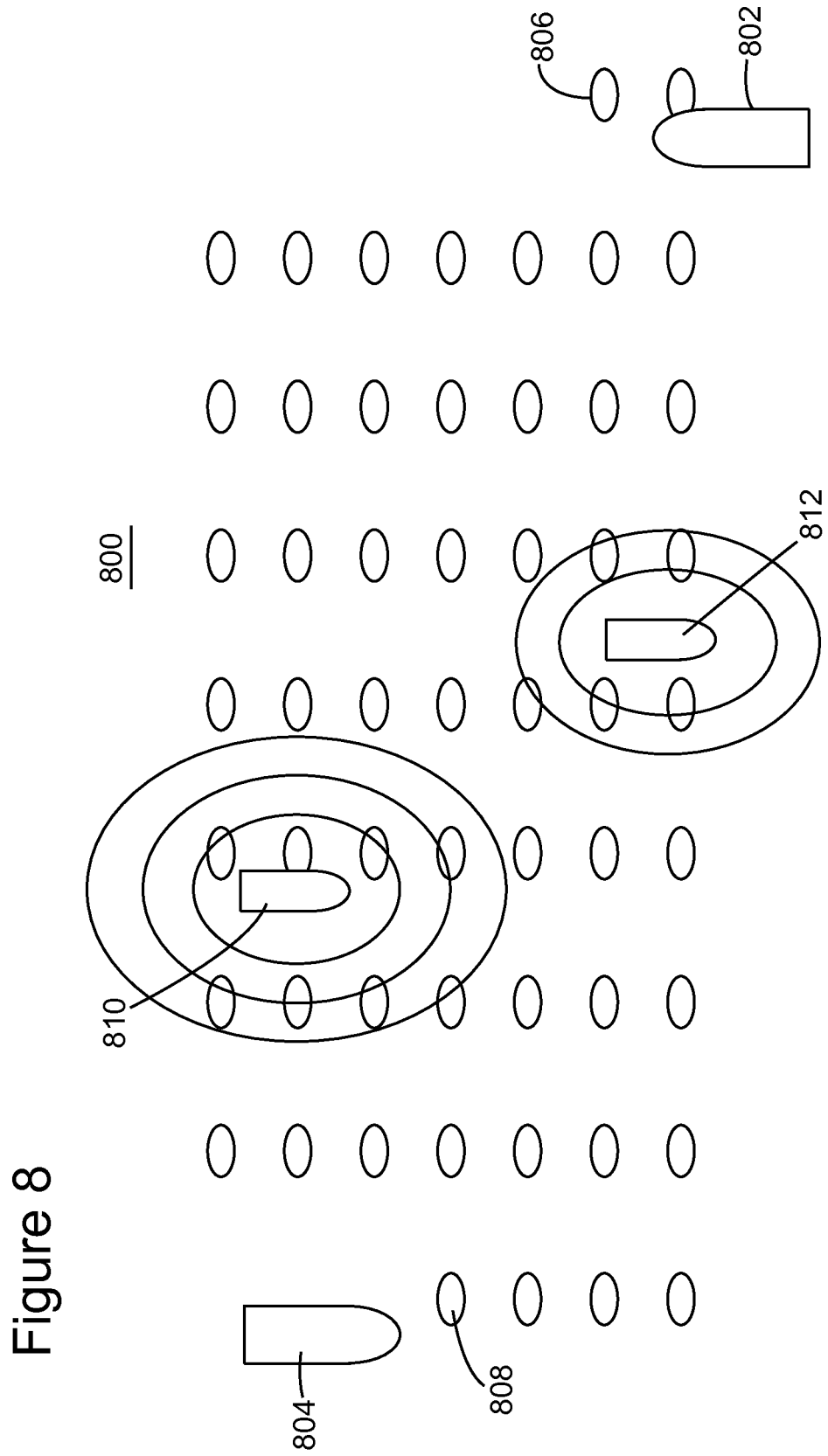
FIG. 8 is a schematic diagram of a seismic system for acquiring seismic data.

An embodiment that schematically illustrates how the AUVs are launched and recovered is now discussed with regard to FIG. 8. This embodiment shows a seismic system 800 that includes a deployment vessel 802 and a recovery vessel 804. The deployment vessel 802 deploys AUVs 806 while the recovery vessel 804 recovers AUVs 808. AUV 806 may be any one of those discussed above. In this embodiment, dedicated shooting vessels 810 and 812 follow their own path and generate acoustic waves. In one application, the deployment and recovery vessels do not tow source arrays. Although FIG. 8 shows two shooting vessels, those skilled in the art would appreciate that one or more than two shooting vessels may be used. In another application, the deployment and recovery vessels operate continuously. When the deployment vessel is empty, it switches positions with the recovery vessel. The shooting of the sources may continue while the deployment and recovery vessels switch positions.

The deploying and recovery processes discussed above are just some examples for illustrating the novel concepts of using AUVs for seismic data recording. Those skilled in the art would appreciate that these processes may be changed, adjusted or modified to fit various needs. For example, the deploying and recovery vessel may be the same vessel. A vessel may be a traditional floating vessel, a platform floating underwater, a platform attached to a float or a traditional vessel, an unmanned vessel that floats at the ocean surface or underwater, etc.

Figure 9:
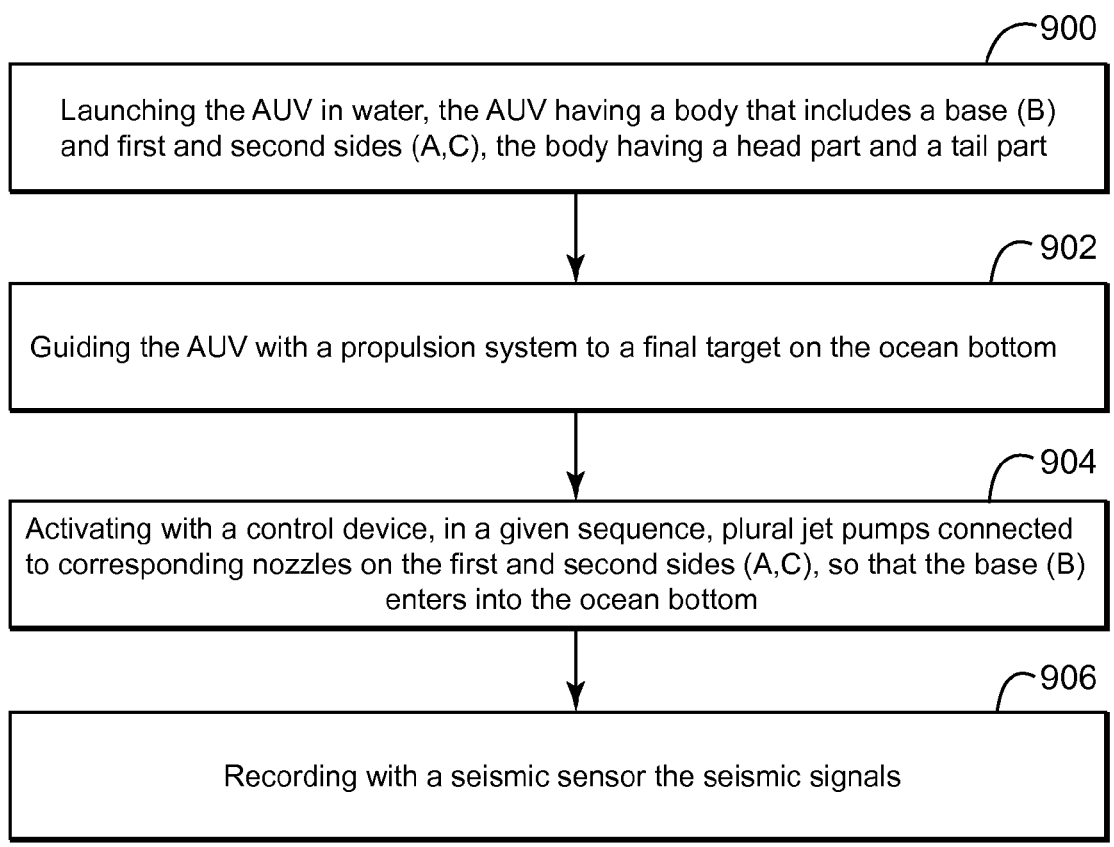
FIG. 9 is a flowchart of a method for anchoring an AUV when on the ocean bottom according to an exemplary embodiment.

A method for anchoring AUV 500 to the ocean bottom for recording seismic signals during a marine seismic survey is now discussed with regard to FIG. 9. The method includes a step 900 of launching the AUV in water; a step 902 of guiding the AUV with a propulsion system to a final target on the ocean bottom; a step 904 of activating with a control device, in a given sequence, the plural jet pumps, which are connected to corresponding nozzles on the first and second sides A and C of the body, so that base face B couples with the ocean bottom; and a step 906 of recording with a seismic sensor the seismic signals.

The given sequence may include simultaneously activating first head nozzle 504a and second tail nozzle 508c to produce a first twisting motion of base face B, and simultaneously activating second head nozzle 504c and first tail nozzle 508a to produce a second twisting motion of base face B. The given sequence may be repeated a given number of times. Optionally, the given sequence further includes simultaneously activating third head nozzle 504b and a third tail nozzle 508b on base face B for fluidizing the ocean bottom. In one application, the speed of water jets corresponding to first and second head nozzles and first and second tail nozzles is larger than a speed of water jets of the third head nozzle and the third tail nozzle.

The given sequence may include a first subsequence that comprises simultaneously activating first head nozzle 504a and first tail nozzle 508a to produce a first rocking motion of base face B, and simultaneously activating second head nozzle 504c and second tail nozzle 508c to produce a second rocking motion of base face B. The given sequence may further include a second subsequence that comprises simultaneously activating first head nozzle 504a and second tail nozzle 508c to produce a first twisting motion of base face B, and simultaneously activating second head nozzle 504c and first tail nozzle 508a to produce a second twisting motion of base face B. In one application, the first subsequence and the second subsequence are alternately repeated a given number of times.

Figure 10:
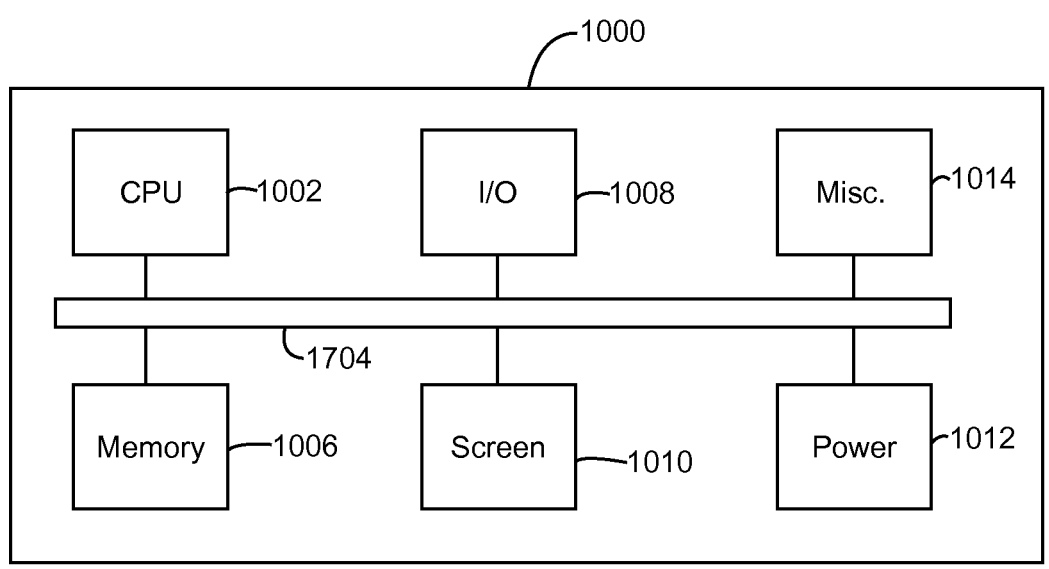
FIG. 10 is a schematic diagram of a control device for controlling anchoring of an AUV according to an exemplary embodiment.

FIG. 10 schematically illustrates an internal configuration of a control device 1000, which corresponds, for example, to control device 530 used in one or more of the above-discussed embodiments. The control device 1000 may include a processor 1002 connected to a bus 1004. The processor 1002 is configured to execute commands stored, for example, in a storage device 1006. Based on these commands, the processor 1002 activates corresponding jet pumps to achieve a desired activation sequence. The control device 1000 may include an input/output interface 1008 through which an operator may interact with the control device. The input/output interface 1008 may be also used by the AUV to directly communicate with a corresponding interface on the deployment/recovery vessel. For example, diagnostic messages, seismic data or quality data may be exchanged through this interface. The control device 1000 may optionally include a screen 1010, a power source 1012 and other components 1014 as will be recognized by those skilled in the art.

One or more of the exemplary embodiments discussed above disclose an AUV configured to partially bury itself after landing on the ocean bottom and prior to performing seismic recordings. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An autonomous underwater vehicle (AUV) for recording seismic signals during a marine seismic survey, the AUV comprising:
   a body having a base (B) and first and second sides (A, C), the body having a head part and a tail part;
   a propulsion system for guiding the AUV to a target on the ocean bottom;
   jet pumps connected to corresponding nozzles on the first and second sides (A, C);
   a control device connected to the jet pumps; and
   a seismic sensor configured to record seismic signals,
   wherein the jet pumps are configured to actuate by the control device in a given sequence so that the base (B) penetrates into the ocean bottom by rocking or twisting the base relative to the ocean bottom.

2. The AUV of claim 1, wherein the jet pumps comprise:
   first and second head jet pumps; and
   first and second tail jet pumps.

3. The AUV of claim 2, wherein the nozzles comprise:
   first and second head nozzles fluidly connected to the first and second head jet pumps, respectively, wherein the first head nozzle is located on the first side (A) and the second head nozzle is located on the second side (C); and
   first and second tail nozzles fluidly connected to the first and second tail jet pumps, respectively, wherein the first tail nozzle is located on the first side (A) and the second tail nozzle is located on the second side (C).

4. The AUV of claim 3, wherein the given sequence comprises:
   simultaneously activating the first head nozzle and the second tail nozzle to produce a first twisting motion of the base (B); and
   simultaneously activating the second head nozzle and the first tail nozzle to produce a second twisting motion of the base (B).

5. The AUV of claim 4, wherein the given sequence is repeated a given number of times.

6. The AUV of claim 4, wherein the given sequence further comprises:

simultaneously activating a third head nozzle on the base (B) and a third tail nozzle on the base (B) for fluidizing the ocean bottom.

7. The AUV of claim 6, wherein a speed of water jets corresponding to first and second head nozzles and first and second tail nozzles is larger than a speed of water jets of the third head nozzle and the third tail nozzle.

8. The AUV of claim 3, wherein the given sequence includes a first sub-sequence that comprises:
simultaneously activating the first head nozzle and the first tail nozzle to produce a first rocking motion of the base (B); and
simultaneously activating the second head nozzle and the second tail nozzle to produce a second rocking motion of the base (B).

9. The AUV of claim 8, wherein the given sequence further includes a second subsequence that comprises:
simultaneously activating the first head nozzle and the second tail nozzle to produce a first twisting motion of the base (B); and
simultaneously activating the second head nozzle and the first tail nozzle to produce a second twisting motion of the base (B).

10. The AUV of claim 9, wherein the first sub-sequence and the second sub-sequence are alternately repeated a given number of times.

11. The AUV of claim 1, wherein
the jet pumps comprise:
first to third head jet pumps, and
first to third tail jet pumps;
the nozzles comprise:
first to third head nozzles fluidly connected to the first to third head jet pumps, respectively, wherein the first head nozzle is located on the first side (A), the second head nozzle is located on the base (B), and the third head nozzle is located on the second side (C), and
first to third tail nozzles fluidly connected to the first to third tail jet pumps, respectively, wherein the first tail nozzle is located on the first side (A), the second tail nozzle is located on the base (B), and the third tail nozzle is located on the second side (C).

12. The AUV of claim 1, wherein each jet pump is configured to operate independently of the other jet pumps.

13. The AUV of claim 1, wherein the propulsion system is separate from the jet pumps and comprises one or more propellers configured to provide thrust to the AUV.

14. The AUV of claim 1, wherein the jet pumps comprise:
at least first to third head nozzles fluidly connected to first to third head jet pumps, and
at least first to third tail nozzles fluidly connected to first to third tail jet pumps,
wherein the first side (a) comprises at least two nozzles, the second side (C) comprises at least two nozzles, and the base (B) comprises at least two nozzles.

15. The AUV of claim 1, wherein the jet pumps are configured to actuate in a given sequence so that the base (B) penetrates into the ocean bottom by rocking and twisting the base relative to the ocean bottom.

16. An autonomous underwater vehicle (AUV) for recording seismic signals during a marine seismic survey, the AUV comprising:
a propulsion system for guiding the AUV to a target on the ocean bottom;
jet pumps connected to corresponding nozzles located on a body of the AUV; and
a control device connected to the jet pumps,
wherein the jet pumps are configured to actuate by the control device in a given sequence so that a base (B) of the body is anchored into the ocean bottom by rocking or twisting the base relative to the ocean bottom.

17. The AUV of claim 16, wherein the propulsion system is separate from the jet pumps and comprises one or more propellers configured to provide thrust to the AUV.

18. A marine seismic survey system for generating seismic waves and recording seismic signals, the system comprising:
a source vessel towing a seismic source for generating the seismic waves; and
plural autonomous underwater vehicles (AUV) for recording the seismic signals,
wherein an AUV includes,
a propulsion system for guiding the AUV to a target on the ocean bottom;
jet pumps connected to corresponding nozzles located on a body of the AUV; and
a control device connected to the jet pumps,
wherein the jet pumps are configured to actuate by the control device in a given sequence so that a base of the body is anchored into the ocean bottom by rocking or twisting the base relative to the ocean bottom.

19. A method for anchoring to the ocean bottom an autonomous underwater vehicle (AUV) for recording seismic signals during a marine seismic survey, the method comprising:
launching the AUV in water, the AUV having a body that includes a base (B) and first and second sides (A, C), the body having a head part and a tail part;
guiding the AUV with a propulsion system to a target on the ocean bottom;
activating with a control device, in a given sequence, plural jet pumps connected to corresponding nozzles on the first and second sides (A, C), so that the base (B) penetrates into the ocean bottom by rocking or twisting the base relative to the ocean bottom; and
recording with a seismic sensor the seismic signals.

20. The method of claim 19, wherein the plural jet pumps comprise:
first and second head jet pumps; and
first and second tail jet pumps.

21. The method of claim 20, wherein the nozzles comprise:
first and second head nozzles fluidly connected to the first and second head jet pumps, respectively, wherein the first head nozzle is located on the first side (A) and the second head nozzle is located on the second side (C); and
first and second tail nozzles fluidly connected to the first and second tail jet pumps, respectively, wherein the first tail nozzle is located on the first side (A) and the second tail nozzle is located on the second side (C).

22. The method of claim 21, wherein the given sequence comprises:
simultaneously activating the first head nozzle and the second tail nozzle to produce a first twisting motion of the base (B); and
simultaneously activating the second head nozzle and the first tail nozzle to produce a second twisting motion of the base (B).

23. The method of claim 22, wherein the given sequence is repeated a given number of times.

24. The method of claim 22, wherein the given sequence further comprises:
simultaneously activating a third head nozzle on the base (B) and a third tail nozzle on the base (B) for fluidizing the ocean bottom.

25. The method of claim 24, wherein a speed of water jets corresponding to first and second head nozzles and first and second tail nozzles is larger than a speed of water jest of the third head nozzle and the third tail nozzle.

26. The method of claim 21, wherein the given sequence includes a first sub-sequence that comprises:
   simultaneously activating the first head nozzle and the first tail nozzle to produce a first rocking motion of the base (B); and
   simultaneously activating the second head nozzle and the second tail nozzle to produce a second rocking motion of the base (B).

27. The method of claim 26, wherein the given sequence further includes a second subsequence that comprises:
   simultaneously activating the first head nozzle and the second tail nozzle to produce a first twisting motion of the base (B); and
   simultaneously activating the second head nozzle and the first tail nozzle to produce a second twisting motion of the base (B).

28. The method of claim 27, wherein the first sub-sequence and the second sub-sequence are alternately repeated a given number of times.

\* \* \* \* \*